United States Patent
Coppage et al.

(10) Patent No.: US 9,857,666 B2
(45) Date of Patent: Jan. 2, 2018

(54) MICROSCOPE OBSERVATION TUBE SMART-PHONE ADAPTOR

(71) Applicant: IRIDEX Corporation, Mountain View, CA (US)

(72) Inventors: Aaron Coppage, Superior, CO (US); Alexander Fernandez, Mountain View, CA (US)

(73) Assignee: IRIDEX CORPORATION, Mountain View, CA (US)

( * ) Notice: Subject to any disclaimer, the term of this patent is extended or adjusted under 35 U.S.C. 154(b) by 27 days.

(21) Appl. No.: 14/961,469

(22) Filed: Dec. 7, 2015

(65) Prior Publication Data

US 2016/0202464 A1 Jul. 14, 2016

Related U.S. Application Data

(63) Continuation of application No. PCT/US2014/037528, filed on May 9, 2014, which is
(Continued)

(51) Int. Cl.
*H04N 5/225* (2006.01)
*G03B 17/56* (2006.01)
(Continued)

(52) U.S. Cl.
CPC ....... *G03B 17/561* (2013.01); *G02B 21/0008* (2013.01); *G02B 21/362* (2013.01);
(Continued)

(58) Field of Classification Search
CPC .......... H04M 1/0264; G02B 7/02–7/16; G02B 21/00–21/368; H04N 5/2251; H04N 5/2252
(Continued)

(56) References Cited

U.S. PATENT DOCUMENTS

| 4,498,749 A | 2/1985 | Hoover |
| 4,504,129 A | 3/1985 | Van Iderstine |

(Continued)

OTHER PUBLICATIONS

PCT/US2014/037528, International Search Report and Written Opinion, dated Sep. 11, 2014, 9 Pages.

*Primary Examiner* — Xi Wang
(74) *Attorney, Agent, or Firm* — Kilpatrick, Townsend & Stockton LLP

(57) ABSTRACT

The present invention generally relates to methods and devices for mounting an image capture device to an optical viewing instrument such as a microscope, telescope, or binocular. More specifically, some embodiments of the present invention relate to an apparatus for mounting a smart phone to an observation tube of microscope. The optical viewing instrument may have an observation tube and an ocular attached thereto. The adapter may include an observation tube ring mount configured to be installed on the observation tube. An observation tube mount may be configured to engage with the installed ring mount. An image capture device holder may be configured to couple with the observation tube mount and configured to receive an image capture device. The image capture device may be a common device such as a smart phone. Optionally, a window may be included in the observation tube mount to facilitate viewing of ocular indicia.

21 Claims, 4 Drawing Sheets

Related U.S. Application Data a continuation of application No. 14/019,858, filed on Sep. 6, 2013, now Pat. No. 9,122,131.

(60) Provisional application No. 61/831,433, filed on Jun. 5, 2013.

(51) Int. Cl.
| | |
|---|---|
| *G02B 21/36* | (2006.01) |
| *G03B 17/48* | (2006.01) |
| *G02B 23/16* | (2006.01) |
| *G02B 21/00* | (2006.01) |
| *G03B 17/14* | (2006.01) |

(52) U.S. Cl.
CPC ............ *G02B 23/16* (2013.01); *G03B 17/14* (2013.01); *G03B 17/48* (2013.01); *H04N 5/2251* (2013.01); *Y10T 29/49826* (2015.01)

(58) Field of Classification Search
USPC ..... 348/373–376, 78, 369, 345, 79; 294/139
See application file for complete search history.

(56) References Cited

U.S. PATENT DOCUMENTS

| | | | |
|---|---|---|---|
| 6,357,937 B1 | 3/2002 | Stratton, Jr. | |
| 6,781,630 B2 | 8/2004 | Nomura et al. | |
| 7,922,402 B2 | 4/2011 | Gaertner et al. | |
| 8,253,787 B2 | 8/2012 | Yamamoto | |
| D682,903 S | 5/2013 | Bratt | |
| 8,905,543 B2 | 12/2014 | Davis | |
| 2004/0120703 A1* | 6/2004 | Dirisio | G03B 9/04 396/493 |
| 2009/0109533 A1 | 4/2009 | Laganas et al. | |
| 2009/0296210 A1 | 12/2009 | Schlierbach et al. | |
| 2010/0086295 A1* | 4/2010 | Wood | G03B 17/00 396/428 |
| 2010/0142036 A1 | 6/2010 | Sterns et al. | |
| 2011/0009163 A1 | 1/2011 | Fletcher et al. | |
| 2011/0317993 A1* | 12/2011 | Weissler | G02B 23/16 396/428 |
| 2012/0044407 A1* | 2/2012 | Murashima | G03B 13/36 348/345 |
| 2012/0050853 A1 | 3/2012 | Miller et al. | |
| 2012/0157160 A1 | 6/2012 | Ozcan et al. | |
| 2012/0268648 A1* | 10/2012 | Yang | H04N 5/2252 348/360 |
| 2012/0295667 A1* | 11/2012 | Tomasini | H04M 1/04 455/569.2 |
| 2013/0016963 A1 | 1/2013 | Miller | |
| 2013/0100271 A1* | 4/2013 | Howes | H04N 5/2251 348/78 |
| 2013/0142440 A1 | 6/2013 | Hirayama et al. | |
| 2013/0148955 A1* | 6/2013 | Overall | G03B 17/566 396/544 |
| 2014/0362283 A1 | 12/2014 | Coppage et al. | |

\* cited by examiner

MICROSCOPE OBSERVATION TUBE SMART-PHONE ADAPTOR

CROSS REFERENCE TO RELATED APPLICATION DATA

The present application is a Continuation of PCT/US2014/037,528 filed May 9, 2014; which claims the benefit of U.S. Provisional Application No. 61/831,433 filed Jun. 5, 2013; and U.S. patent application Ser. No. 14/019,858 filed Sep. 6, 2013 (now U.S. Pat. No. 9,122,131). The full disclosures which are incorporated herein by reference in their entirety for all purposes.

BACKGROUND

The present invention generally relates to methods and devices for mounting an image capture device to an optical viewing instrument such as a microscope, telescope, or binocular. More specifically, some embodiments of the present invention relate to an apparatus for mounting a smart phone to an observation tube of an optical viewing instrument.

Optical instruments may be used for enhancing images for viewing by a user. For example, telescopes may aid in the observation of remote objects and microscopes may aid in the observation of objects that are too small for observation by the unaided eye. It may be desirable to mount an image capture device to the optical instrument so that the enhanced image may be captured and recorded or transmitted by the image capture device. While some adaptors have been developed, there is a need in the art for more robust adaptors and adaptors with less expensive components.

SUMMARY OF THE INVENTION

The use of microscopes is common within the medical area for viewing of a working area. The use of an observation tube or co-observation tube is especially common for teaching and recording of the primary viewing field. The adaptor device described herein may provide the ability to adapt common devices such as smart phones (including an iPhone™, a Samsung Galaxy™ phone, a Blackberry™ device, or other mobile processor having an image capture device) to an optical viewing instrument's observation/co-observation tubes for image and video capture and transmission.

In some embodiments, an adapter system for mounting an image capture device to an optical viewing instrument is provided. The optical viewing instrument may have an observation tube and an ocular attached thereto. The adapter may include an observation tube ring mount configured to be rigidly installed on the observation tube. An observation tube mount may be configured to engage with the installed ring mount. An image capture device holder may be configured to couple with the observation tube mount and configured to receive an image capture device. The image capture device may be a common device such as a smart phone.

In some embodiments, the observation tube ring mount is configured to be installed on the observation tube distally from the ocular. Optionally the observation tube ring mount is configured to be installed by removing the ocular of the optical viewing instrument, installing the ring mount on the observation tube and then reinstalling the ocular of the optical view instrument after ring mount installation. In some embodiments, the observation tube mount is configured to couple with the ring mount by sliding over the ocular of the optical viewing instrument. Optionally, the observation tube mount includes a viewing window that facilitates viewing of indicia on the ocular. The indicia may include an ocular magnification value and/or other ocular information. Further, in some embodiments, the installed observation tube mount allows for the adjustment of ocular magnification. The observation tube mount may couple with the ring mount using a circumferential clamp mechanism. This may allow for quick and easy connection and disconnection of the system from the ring mount. Optionally, the adapter does not include a lens so as to reduce manufacturing costs.

In some embodiments, a method is provided for modifying an optical viewing instrument so that an image capture device may be mounted to the optical viewing instrument. The optical viewing instrument may have an observation tube and an ocular attached thereto. The method may include installing an observation tube ring mount on the observation tube; securing an observation tube mount over the ring mount; and coupling an image capture device holder with the observation tube mount. Optionally the observation tube ring mount may be installed on the observation tube distally from the ocular. In some embodiments the method further includes removing the ocular of the optical viewing instrument prior to installing the observation tube ring mount on the observation tube and reinstalling the ocular of the optical viewing instrument after installing the observation tube ring mount on the observation tube.

In some embodiments the observation tube mount may be slid over the ocular prior to securing the observation tube mount to the ring mount. Optionally, the observation tube mount includes a viewing window that facilitates the viewing of ocular indicia. In certain embodiments the secured observation tube mount allows for the adjustment of ocular magnification when installed on the optical viewing instrument. In some embodiments the observation tube mount is secured to the ring mount using a circumferential clamp mechanism. Optionally, the modification of the optical viewing instrument does not add, remove, or substitute for a lens.

In certain embodiments, an adaptor system is provided for mounting a smart phone to a microscope. The system may include an observation tube ring mount configured to be installed on the observation tube. The system may also include an observation tube mount having a circumferential clamp and a viewing window. The observation tube mount may be configured to slide over the ocular and engage with the ring mount. The viewing window may be configured to facilitate viewing of ocular indicia. A smart phone holder may be configured to couple with the observation tube mount and configured to receive a smart phone. The smart phone holder may be further configured to align a camera of a received smart phone with an optical axis of the microscope. Certain embodiments of the adaptor system do not include a lens so as to reduce manufacturing costs. In some embodiments, the adaptor system allows for ocular magnification of the microscope to be adjusted when the adaptor system is connected thereto.

In yet another embodiment of the invention, a method is provided for modifying a microscope so that a smart phone may be mounted to the microscope. The method may include the step of removing the ocular of the microscope from the observation tube and installing an observation tube ring mount on the observation tube. Thereafter, the ocular may be reinstalled back to the observation tube. An observation tube mount may be slid over the reinstalled ocular and secured to the ring mount using a circumferential clamp. A smart phone holder may then couple with the secured observation tube mount. Optionally, the observation tube mount may have a viewing window for facilitating view of ocular indicia.

Although exemplary embodiments have been described in detail above, many variations are available. Further features of the invention, its nature and various advantages will be more apparent from the accompanying drawings and the following detailed description.

DETAILED DESCRIPTION OF THE INVENTION

Figure 1A:
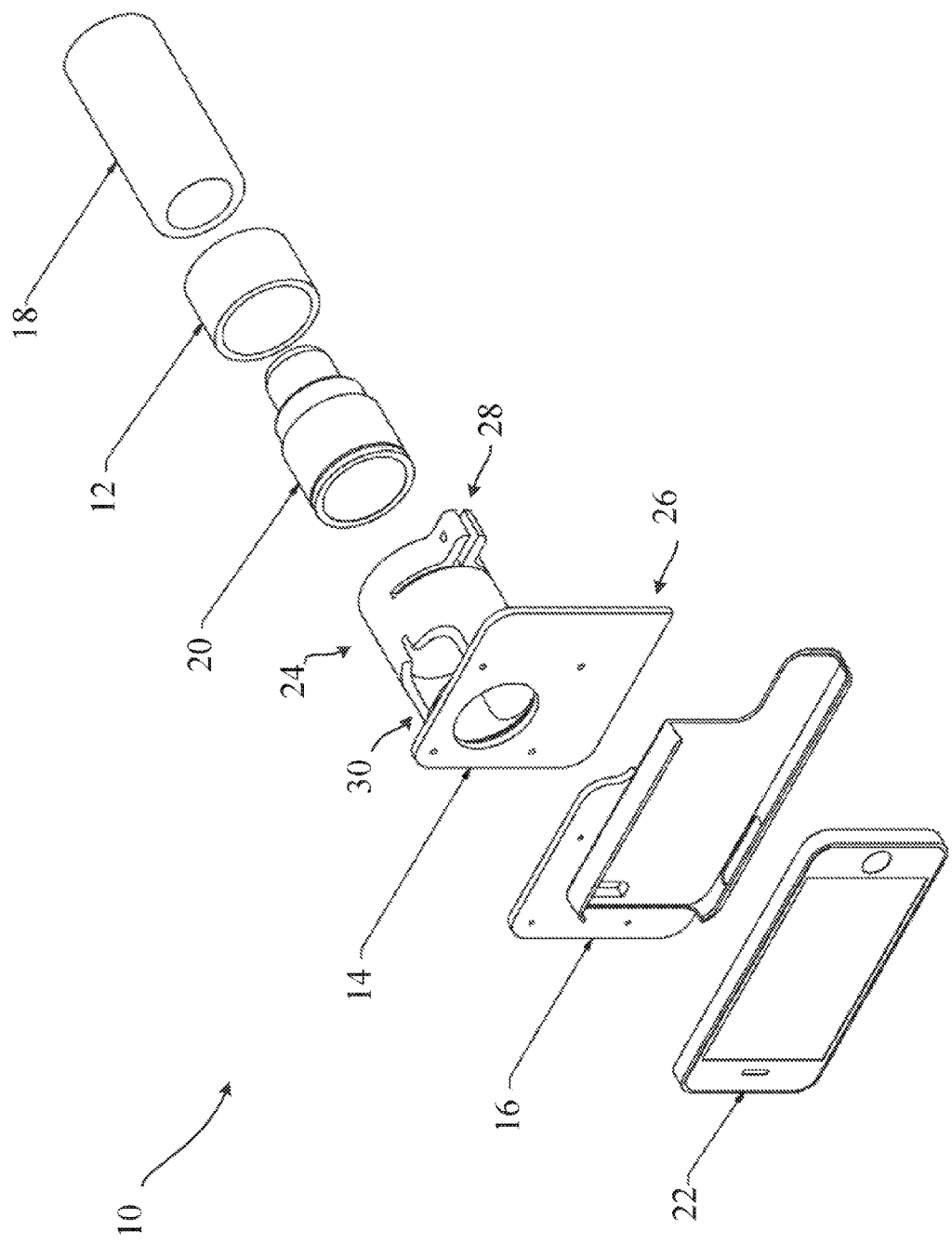
FIGS. 1A-1C are multiple views of an exemplary smart phone microscope observation tube adaptor.
Figure 1B:
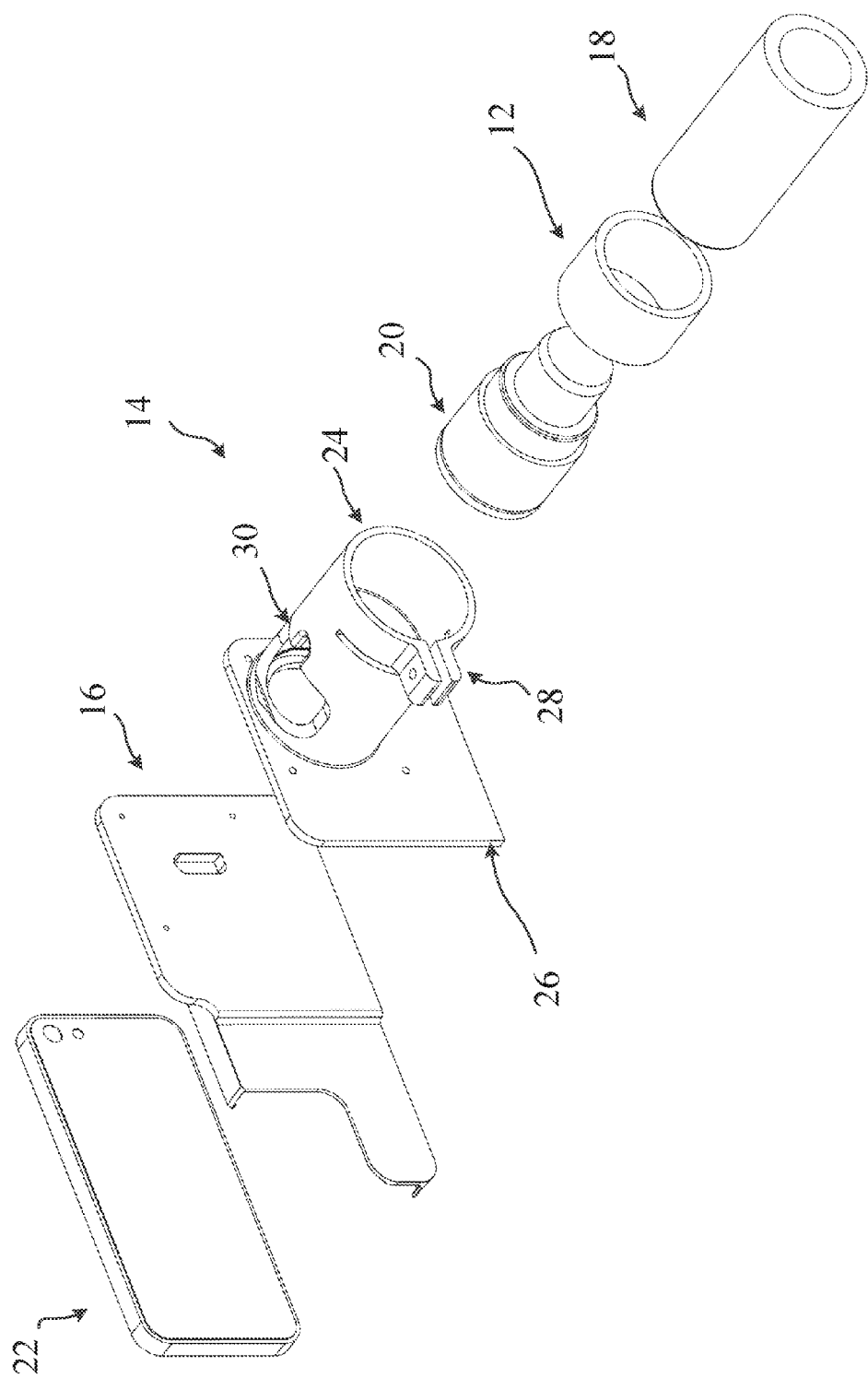
Figure 1C:
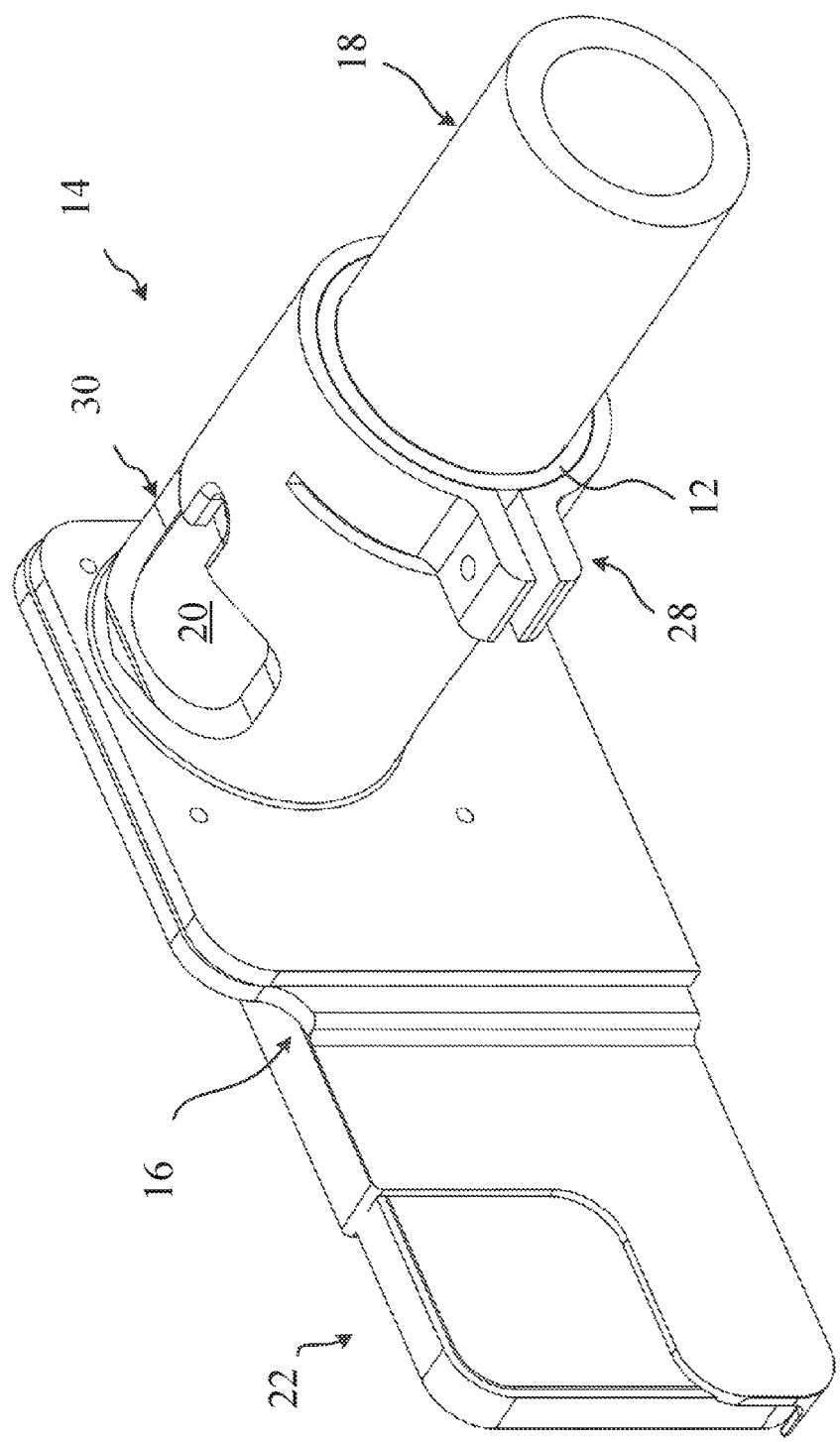

FIGS. 1A-1C are multiple views of an exemplary observation tube adaptor 10. As shown in FIGS. 1A-1C, the exemplary adaptor includes an observation tube ring mount 12, an observation tube mount 14, and an image capture device holder 16. Observation tube 18 and ocular 20 may be components of the microscope. When the exemplary adaptor 10 is installed on the microscope, the image capture device holder 16 may receive an image capture device 22 and align a camera of the device 22 with the optical axis of the microscope. Thereafter, the device 22 may be used to capture, record or transmit images of the microscope viewing field.

Observation tube ring mount 12 may be defined as a ring configured to fit over the observation tube housing 18. Preferably the ring mount 12 is configured to rigidly couple with the observation tube 18 to minimize axial rotation of the installed ring mount 12. In some embodiments the ring mount 12 is dimensioned to fittingly mate with an observation tube housing 18 of a particular manufacturer. For example, a first ring mount may be configured to friction fit with a Carl Zeiss observation tube while a second ring mount may be configured to friction fit with a Haag Streit observation tube. Optionally, ring mount 12 may include an engagement feature for securing ring mount 12 to observation tube 18. For example, a circumferential clamp may be used to secure ring mount 12 to observation tube 18. Hence, ring mount 12 may be configured so as to fit a range of observation tube sizes. Ring mount 12 may include a slit to form a C-shape so as to accommodate a range of observation tube diameters. This feature may allow adaptor 10 to conform to various observation tubes 18. While observation tube ring 12 is illustrated with a cylindrical outer surface, other outer surface configurations are possible. In some embodiments, the outer surface of observation tube ring 12 may include engagement features for coupling with observation tube mount 14. Some embodiments may be splined, grooved or otherwise keyed interface for radial indexing of the observation tube mount 14 to the ring mount 12.

Observation tube mount 14 may include a distal portion 24 and a proximal portion 26. The distal portion 24 may be defined by a portion configured fittingly mate with observation tube ring mount 12. As illustrated in FIG. 1A-1C, exemplary observation tube mount 14 includes generally cylindrical distal portion 24 dimensioned to fit over ring mount 12. Preferably observation tube mount 14 is configured to rigidly couple with the ring mount 12. In some embodiments, observation tube mount 14 includes one or more engagement features for coupling observation tube mount 14 to ring mount 12. For example, a circumferential clamp 28 may be used to secure ring mount 12 to observation tube 18. Other engagement features are possible such as threaded engagement features, dovetail engagement features, cam clamp mechanisms, spline features etc. Preferably the engagement feature will provide for quick and easy connection and disconnection of the adaptor 10, thus allowing a user to readily switch between each configuration.

The proximal portion 26 may be configured to secure image capture device holder 16. The proximal portion 26 may include a front face which corresponds to and may be secured to image capture device holder 16 with one or more engagement features. The image capture device holder 16 may be secured to observation tube mount 14 in a variety of different orientations depending on how the respective engagement features are aligned. This may allow a user to select between a portrait or landscape image/video capture configuration. Preferably, the back side of the proximal portion 26 includes a cylindrical portion for receiving and overlapping ocular 20 so as to limit ambient light leakage.

In some embodiments, observation tube mount 14 may include viewing window 30. Viewing window 30 may facilitate viewing of ocular indicia. The indicia may include the ocular magnification value and/or other ocular info. Preferably, ocular magnification may still be adjusted while observation tube 14 is secured to ring mount 12. This feature may allow a user the ability magnify and focus the optical viewing instrument beyond the ability of an autofocus of the image capture device 22.

As illustrated in FIG. 1A-1C, image capture device holder 16 comprises a phone case and image capture device 22 is a smart phone. In some embodiments, image capture device holder 16 is configured so that image capture device 22 may slide into or snap to the image capture device holder 16. While image capture device holder 16 is configured per a specific smart phone 22, other configurations are possible to correspond with other types of smart phones (e.g., Blackberry™ phones, Samsung™ phones, Apple™ phones, etc.) or devices (e.g., music players, video players, PDA devices, etc., which include an image capture device).

In some embodiments, image capture device holder 16 may be interchanged with other image capture device holders 16 having alternative configurations for receiving other types of image capture devices 22. Accordingly, observation tube mount 14 may have a universal proximal portion 26 for receiving a variety of image capture device holders 16. This feature may provide adaptor 10 the ability to receive and center view various image capture devices 22 to adaptor 10. In some embodiments, adaptor 10 may be independent of observation tube ocular magnification. Preferably, the adaptor does not impede the ability to optimize lighting.

Figure 2:
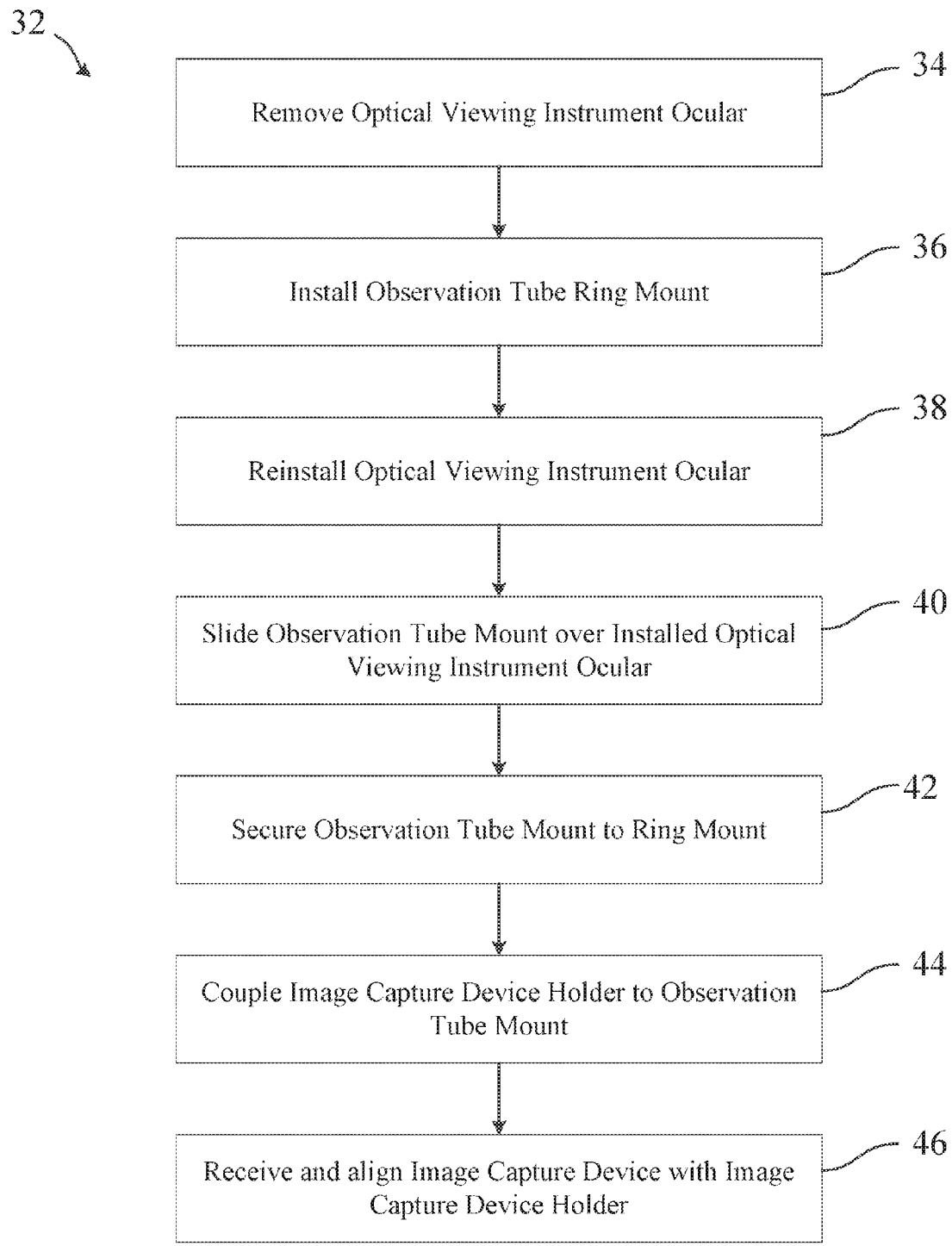
FIG. 2 is an exemplary method of modifying an optical viewing instrument according to some aspects of the present invention.

FIG. 2 is an exemplary method 32 of modifying an optical viewing instrument according to some aspects of the present invention. At step 34, the ocular may be removed from an optical viewing instrument's observation tube. At step 36, a dedicated ring mount may be installed onto the observation tube. At step 38 the ocular is reinstalled in the observation tube housing. At step 40, the observation tube mount slides over the ocular and at step 42, the observation tube mount engages the ring mount. In some embodiments, the observation tube mount may be secured by tightening a clamp mechanism to secure the observation tube mount with the observation tube. At step 44 an image capture device holder may be connected to the observation tube mount. At step 46 an image capture device such as a smart phone may be installed into the holder. Thereafter, photos and video can be captured and transmitted as desired by the operator.

While method 32 illustrated herein may be described as a series of consecutive steps, none of these steps are limited to any particular order. For example, an image capture device may be installed into a respective holder 46 prior to connecting the holder to the observation tube mount 44. Additionally, it should be understood that the various illustrative embodiments of the present invention described above have been presented by way of example only, and not limitation. Thus, the breadth and scope of the present invention should not be limited by any of the above-described exemplary embodiments, but should be defined only in accordance with the following claims and their equivalents.

What is claimed is:

1. An adapter system for mounting an image capture device to an optical viewing instrument, the optical viewing instrument having an observation tube, the adapter comprising:
    an observation tube ring mount having an outer surface opposite an inner surface, the inner surface of the observation tube ring mount configured to engage with the observation tube of the optical viewing instrument;
    an observation tube mount having a proximal portion and a distal portion, wherein the distal portion of the observation tube mount is configured to engage with the outer surface of the observation tube ring mount, and wherein a back face of the proximal portion of the observation tube mount is configured to overlap with an ocular of the observation tube; and
    an image capture device holder having a proximal face and a distal face, wherein the distal face of the image capture device holder is configured to engage with the proximal portion of the observation tube mount and wherein the proximal face is configured to couple with an image capture device.

2. The adapter system of claim 1, wherein the observation tube ring mount is configured to friction fit with the observation tube of the optical viewing instrument.

3. The adapter system of claim 1, wherein the observation tube ring mount comprises an engagement feature for securing the observation tube ring mount to the observation tube.

4. The adapter system of claim 3, wherein the engagement feature of the observation tube ring mount comprises a circumferential clamp.

5. The adapter system of claim 1, wherein the outer surface of the observation tube ring mount is cylindrical.

6. The adapter system of claim 1, wherein the outer surface of the observation tube ring mount includes an engagement feature for coupling with the observation tube mount.

7. The adapter system of claim 1, wherein the distal portion of the observation tube mount is configured to engage with the outer surface of the observation tube ring mount with a circumferential clamp.

8. The adapter system of claim 1, wherein the distal portion of the observation tube mount is configured to engage with the outer surface of the observation tube ring mount with a threaded engagement feature, a dovetail engagement feature, spline features, or a cam clamp mechanism.

9. The adapter system of claim 1, wherein the image capture device holder is configured to selectively couple with the proximal portion of the observation tube mount such that a user may orient the received image capture device in a portrait or landscape configuration relative to the observation tube mount.

10. The adapter system of claim 1, wherein the image capture device holder comprises a phone case.

11. The adapter system of claim 10, wherein the image capture device holder is configured to slideably receive the image capture device.

12. The adapter system of claim 10, wherein the image capture device holder is configured to snap to the image capture device.

13. The adapter system of claim 1, wherein the distal portion of the observation tube mount includes a viewing window that facilitates viewing of ocular indicia on an ocular of the observation tube or that allows a user to adjust ocular magnification.

14. An adapter system for mounting an image capture device to an optical viewing instrument, the optical viewing instrument having an observation tube, the adapter comprising:
    an observation tube ring mount having an outer surface opposite an inner surface, the inner surface of the observation tube ring mount configured to engage with the observation tube of the optical viewing instrument, wherein the observation tube ring mount is configured to friction fit with the observation tube of the optical viewing instrument, and wherein the observation tube ring mount comprises a slit to form a C-shape so as to accommodate a range of observation tube diameters;
    an observation tube mount having a proximal portion and a distal portion, wherein the distal portion of the observation tube mount is configured to engage with the outer surface of the observation tube ring mount; and
    an image capture device holder having a proximal face and a distal face, wherein the distal face of the image capture device holder is configured to engage with the proximal portion of the observation tube mount, and wherein the proximal face is configured to couple with an image capture device.

15. An adapter system for mounting an image capture device to an optical viewing instrument, the optical viewing instrument having an observation tube, the adapter comprising:
    an observation tube ring mount having an outer surface opposite an inner surface, the inner surface of the observation tube ring mount configured to engage with the observation tube of the optical viewing instrument, and wherein the outer surface of the observation tube ring mount is non-cylindrical;
    an observation tube mount having a proximal portion and a distal portion, wherein the distal portion of the observation tube mount is configured to engage with the outer surface of the observation tube ring mount; and
    an image capture device holder having a proximal face and a distal face, wherein the distal face of the image capture device holder is configured to engage with the proximal portion of the observation tube mount, and wherein the proximal face is configured to couple with an image capture device.

16. An adapter system for mounting an image capture device to an optical viewing instrument, the optical viewing instrument having an observation tube, the adapter comprising:
    an observation tube ring mount having an outer surface opposite an inner surface, the inner surface of the observation tube ring mount configured to engage with the observation tube of the optical viewing instrument;

an observation tube mount having a proximal portion and a distal portion, wherein the distal portion of the observation tube mount is configured to engage with the outer surface of the observation tube ring mount;

wherein the outer surface of the observation tube ring mount includes an engagement feature for coupling with the observation tube mount, and wherein the outer surface of the observation tube ring mount is splined for radial indexing of the observation tube mount to the observation tube ring mount; and an image capture device holder having a proximal face and a distal face, wherein the distal face of the image capture device holder is configured to engage with the proximal portion of the observation tube mount, and wherein the proximal face is configured to couple with an image capture device.

17. An adapter system for mounting an image capture device to an optical viewing instrument, the optical viewing instrument having an observation tube with an optical axis and an ocular attached thereto, the adapter comprising:

an observation tube mount having a proximal portion and a distal portion, wherein the distal portion of the observation tube mount is dimensioned to slide over the ocular of the optical viewing instrument to couple the observation tube mount with the observation tube, wherein a back face of the proximal portion of the observation tube mount is configured to overlap with the ocular of the observation tube, and wherein the distal portion of the observation tube mount includes a viewing window that facilitates viewing of ocular indicia on the ocular of the observation tube or that allows a user to adjust ocular magnification of the ocular while the observation tube mount is coupled with the observation tube; and an image capture device holder having a proximal face and a distal face, wherein the distal face of the image capture device holder is configured to engage with the proximal portion of the observation tube mount, and wherein the proximal face is configured to couple with an image capture device;

wherein the image capture device holder and the observation tube mount are configured to cooperate to align a camera of the image capture device with the optical axis of the optical viewing instrument when the image capture device holder receives the image capture device and the adapter system is engaged with the observation tube of the optical viewing instrument.

18. The adapter system of claim 17, wherein the image capture device holder is configured to selectively couple with the proximal portion of the observation tube mount such that a user may orient the received image capture device in a portrait or landscape configuration relative to the observation tube mount.

19. The adapter system of claim 17, wherein the image capture device holder comprises a phone case configured to slideably receive a phone or configured to snap to the phone.

20. A modified optical viewing instrument, the modified optical viewing instrument comprising:

an observation tube with an optical axis;

an adapter system coupled with the observation tube, the adapter system comprising:

an observation tube ring mount having an outer surface opposite an inner surface, the inner surface of the observation tube ring mount configured to engage with the observation tube of the optical viewing instrument;

an observation tube mount having a proximal portion and a distal portion, wherein the distal portion of the observation tube mount is configured to engage with the outer surface of the observation tube ring mount, and wherein a back face of the proximal portion of the observation tube mount is configured to overlap with an ocular of the observation tube; and an image capture device holder having a proximal face and a distal face, wherein the distal face of the image capture device holder is configured to engage with the proximal portion of the observation tube mount, and wherein the proximal face is configured to couple with an image capture device.

21. The modified optical viewing instrument of claim 20, wherein the observation tube comprises a co-observation tube of the optical viewing instrument.

* * * * *